United States Patent
Hatanaka et al.

(10) Patent No.: US 6,666,091 B2
(45) Date of Patent: Dec. 23, 2003

(54) ANGULAR VELOCITY SENSOR (75) Inventors: Masakazu Hatanaka, Osaka (JP); Satoshi Ouchi, Hyogo (JP); Toshiyuki Nozoe, Kyoto (JP); Shusaku Kawasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/111,575

(22) PCT Filed: Aug. 24, 2001

(86) PCT No.: PCT/JP01/07269
§ 371 (c)(1),
(2), (4) Date: Aug. 23, 2002

(87) PCT Pub. No.: WO02/18875
PCT Pub. Date: Mar. 7, 2002

(65) Prior Publication Data
US 2003/0029239 A1 Feb. 13, 2003

(30) Foreign Application Priority Data
Aug. 30, 2000 (JP) ......................................... 2000-260419

(51) Int. Cl.[7] .................................................. G01P 9/04
(52) U.S. Cl. .................................................. 73/504.16
(58) Field of Search ........................ 73/504.16, 504.12, 73/504.15; 310/370, 329

(56) References Cited
U.S. PATENT DOCUMENTS 5,854,427 A * 12/1998 Terada et al. ............. 73/504.16
6,523,410 B2 * 2/2003 Matsubara et al. ......... 73/504.16
6,564,639 B1 5/2003 Hatanaka et al.

FOREIGN PATENT DOCUMENTS

| EP | 0 955 519 | 11/1999 |
| JP | 08-304075 | 11/1996 |
| JP | 10-38580 | 2/1998 |
| JP | 2001-208546 | 8/2001 |
| WO | 01/36910 | 5/2001 |
| WO | 01/44755 | 6/2001 |

* cited by examiner

Primary Examiner—Helen Kwok
(74) Attorney, Agent, or Firm—RatnerPrestia (57) ABSTRACT An angular velocity sensor with improved detection chacteristics using a tuning fork vibrator made of a single crystalline piezoelectric material such as quartz. The turning fork vibrator includes two vibrators bonded together to provide an integral structure so that the vibrators by their respective crystal axis directions generate a piezoelectric phenomena in inverse polarities in their width directions. The tuning fork vibrator has two tuning fork arms and a tuning fork base. Two detection electrodes are respectively disposed on outer faces of the two tuning fork arms. And two other detection electrodes are respectively disposed on inner faces of the two tuning fork arms. Two drive electrodes are respectively disposed on the two tunings fork arms. The two detection electrodes disposed on the outer faces of the two tuning fork arms are commonly connected, and the two detection electrodes disposed on the inner faces of the two tuning fork arms are commonly connected for canceling capacitive coupling from drive section to detecting section.

19 Claims, 7 Drawing Sheets

ANGULAR VELOCITY SENSOR

This application is a U.S. National Phase application of PCT International application PCT/JP01/07269.

TECHNICAL FIELD

The present invention relates to angular velocity sensors employed for the attitude control and navigation of moving objects such as an airplane, an automobile, robot, a ship, and other vehicles; for prevention of the still and video camera shake; and for the remote control for remotely operated equipment.

BACKGROUND ART

This type of angular velocity sensor is provided with a drive electrode and detection electrode on an U-shaped piezoelectric element. A tuning fork arm of the piezoelectric element is driven by the signal supplied from a single drive power connected to the drive electrode, and the angular velocity signal is taken from the detection electrode while the tuning fork arm is driven.

Recently, an angular velocity sensor using a single crystalline piezoelectric element typically made of quartz or lithium tantalate as an vibrating material has been proposed. This type of sensor is smaller, and has the possibility to supply more inexpensive angular velocity sensors than the type having a structure to attach a ceramic piezoelectric element onto a metal vibrator.

A conventional angular velocity sensor using a single crystalline pieozoelectric element has a pair of arms joined and fixed at their individual ends by a base to form a tuning fork vibrator. This tuning fork vibrator has, for example, an integral structure cut out from a quartz plate. A pair of drive electrodes are provided on one of the arms of the tuning fork vibrator as configured above for driving the tuning fork vibrator piezoelectrically in the direction parallel to a principal plane at a resonant frequency. These drive electrodes are electrically driven by an external oscillator circuit. A monitor electrode, sense electrode and ground electrode are provided on the other arm. The monitor electrode is for detecting the vibration amplitude caused by the oscillator circuit of the tuning fork vibrator. The sense electrode is for piezoelectrically detecting the stress due to the Coriolis force acting perpendicular to the principal plane of the arm against the angular velocity input along the axis direction of the tuning fork vibrator.

Herein, the electric charge generated in the monitor electrode is amplified by an external circuit and then compared with a reference signal preset by an auto gain control (AGC), to control the oscillator circuit for maintaining the vibration amplitude of the tuning fork vibrator constant. On the other hand, the detection electrode detects a signal due to the Coriolis force. This detected signal is amplified by an external amplifier circuit, and then synchronous detection is executed using the signal detected by the monitor electrode. The signal due to the Coriolis force modulated by the tuning fork vibrator is thereafter demodulated and the undesired frequency band is filtered out by an low pass filter (LPF) to generate the sensor output.

However, in the angular velocity sensor as described above, the drive signal induces and mixes a coupled capacity component to the detection electrode. This causes the need for providing another circuit to separate this mixed signal, but mixed signal is not completely separable. Remaining mixed signal becomes unwanted signal noise, degrading the detection characteristics of the sensor. This disadvantage has resulted in an inability to commercialize the conventional sensor on full-scale.

SUMMARY OF THE INVENTION

The present invention solves the above disadvantage, and aims to offer an angular velocity sensor with better detection characteristics by eliminating an effect of the noise generated by unwanted coupled capacity component.

In order to solve the above disadvantage, the angular velocity sensor of the present invention includes a tuning fork vibrator, and first, second, third, fourth, fifth, sixth, seventh, and eighth electrodes. The tuning fork vibrator includes a first vibrator which has at least two arms made of a single crystalline piezoelectric material and at least one base for connecting these arms, and a second vibrator which has approximately the same shape as that of the first vibrator and made of a single crystalline piezoelectric material. The first vibrator and the second vibrator have a crystal axis in which a piezoelectric phenomenon having inverse polarities in their width directions, and are directly bonded in the thickness direction for an integral structure to form the tuning fork vibrator which has at least two tuning fork arms and at least one tuning fork base. The first and second electrodes are disposed on the surface of both tuning fork arms of the tuning fork vibrator. The third and fourth electrodes are disposed on a rear face of the tuning fork arm at positions opposing the first and second electrodes respectively. The fifth, sixth, seventh, and eighth electrodes are disposed on a side face of both tuning fork arms of the tuning fork vibrator as detection electrodes. When the first electrode disposed on the surface of one of the tuning fork arms of the tuning fork vibrator or the third electrode disposed on the rear face of one of the tuning fork arms acts as a drive electrode, the drive power is connected in the next ways. If the first electrode is the drive electrode, the drive electrode in a phase different from that of the first electrode is supplied to the second electrode disposed on the surface of the other tuning fork arm. Alternatively, the drive signal in the same phase as that of the first electrode is supplied to the fourth electrode disposed on the rear face of the other tuning fork arm. If the third electrode is the drive electrode, the drive signal in the same phase as that of the third electrode is supplied to the second electrode disposed on the surface of the other tuning fork arm. Alternatively, the drive signal in a phase different from that of the third electrode is supplied to the fourth electrode disposed on the rear face of the other tuning fork arm. The fifth and eighth electrodes disposed on the outer face of both tuning fork arms are commonly connected, and the sixth and seventh electrodes disposed on the inner face of both tuning fork arms are commonly connected so that the detection signal may be taken at each of these commonly connected sections.

In this configuration, equivalent positive and negative unwanted coupled capacity components from the drive electrode is respectively and equally input to the detection electrodes. Or, unwanted coupled capacity component in the same polarity is equally and respectively input. This enables the cancellation of unwanted coupled capacity component in a respective set of detection electrodes commonly connected. Alternatively, unwanted coupled capacity component may be cancelled when the detected signals are differential-amplified. The effect of noise caused by the coupled capacity component can thus be eliminated, improving detection characteristics.

DETAILED DESCRIPTION OF PREFERRED EMBODIMENTS

First Exemplary Embodiment

A first exemplary embodiment of the present invention is described with reference to FIGS. 1 to 9.

Figure 1:
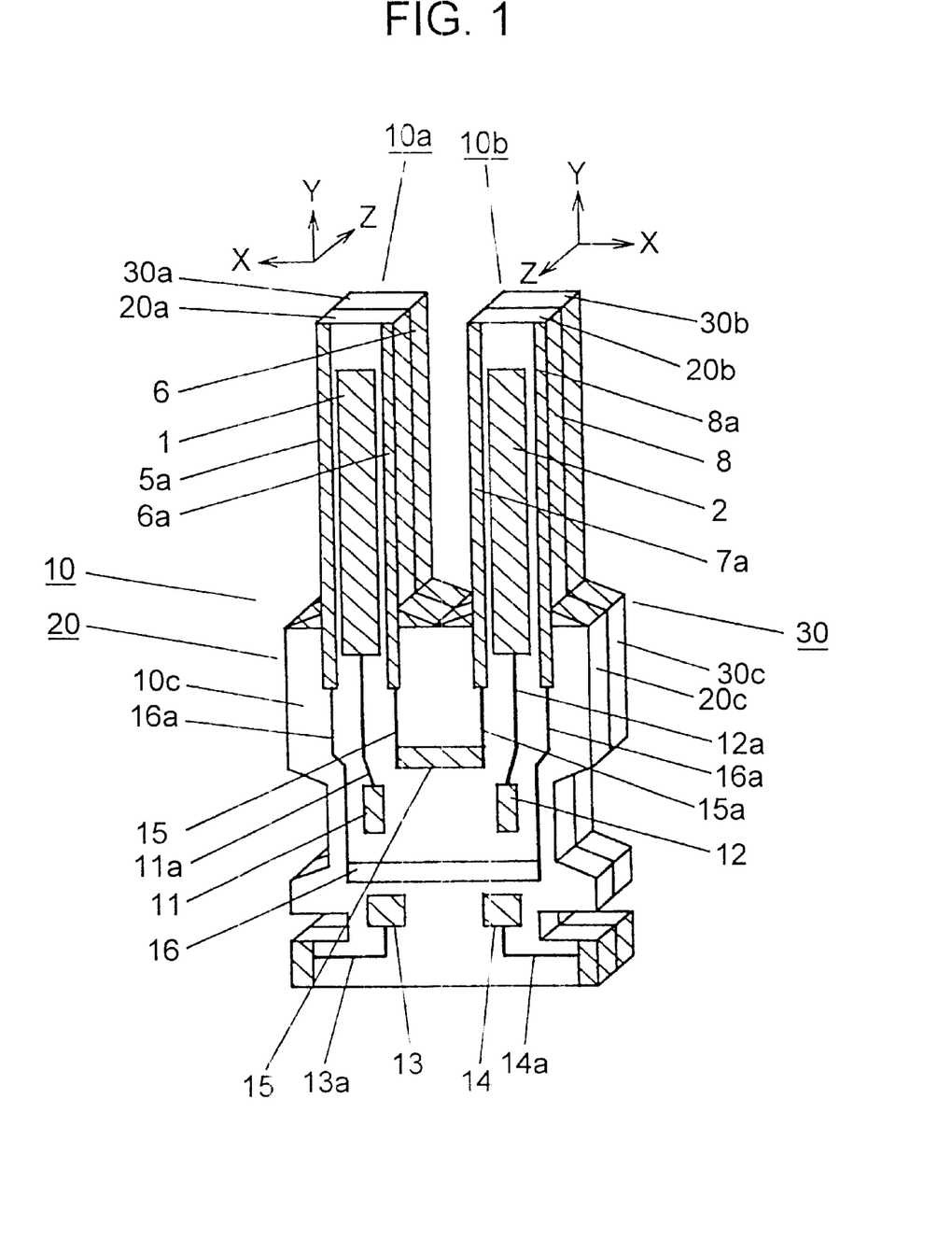
FIG. 1 is a perspective view of an angular velocity sensor seen from the surface of a tuning fork vibrator in accordance with a first exemplary embodiment of the present invention.
Figure 2:
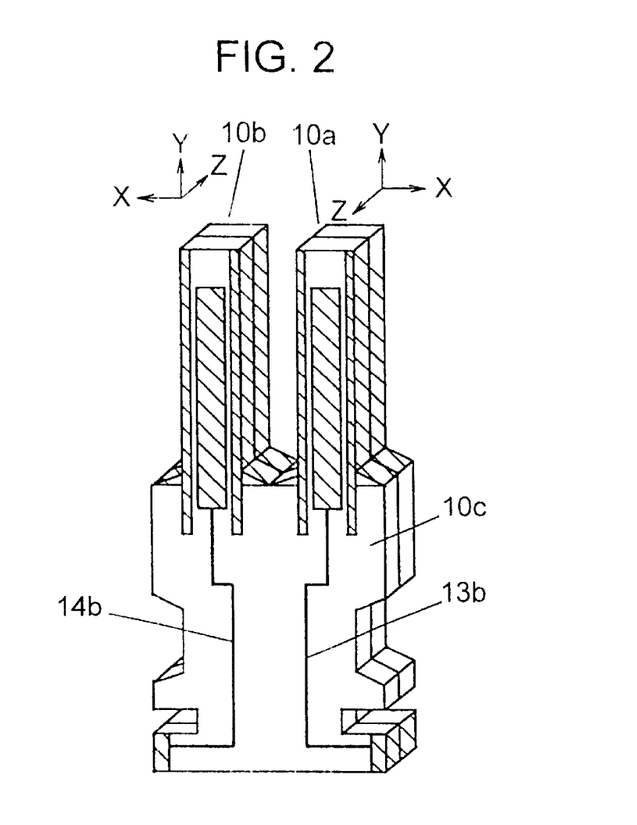
FIG. 2 is a perspective view of the same vibrator seen from the rear face.
Figure 3:
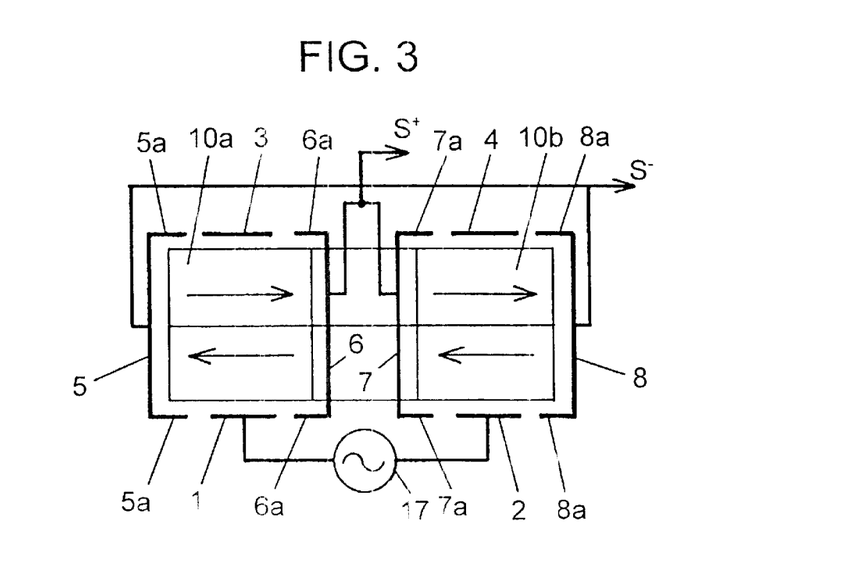
FIG. 3 is a schematic diagram illustrating electrode positions related to a tuning fork arm of the angular velocity sensor in accordance with the first exemplary embodiment.
Figure 4:
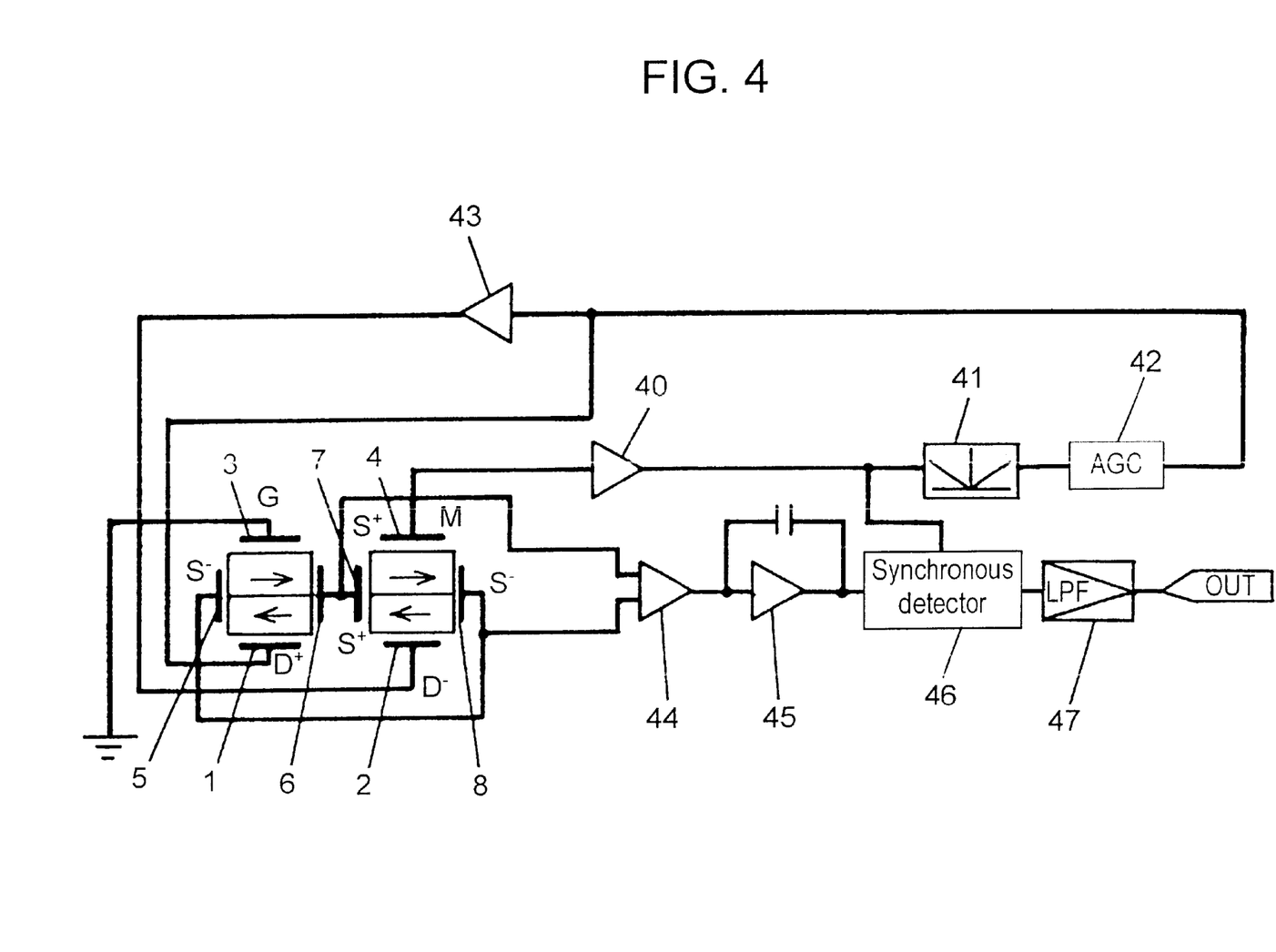
FIG. 4 is a block diagram of an example of an electric circuit of the angular velocity sensor in accordance with the first exemplary embodiment.

FIG. 1 is a perspective view of a tuning fork vibrator seen from the surface in an angular velocity sensor in the first exemplary embodiment of the present invention. FIG. 2 is a perspective view of the same vibrator seen from the rear face. FIG. 3 is a schematic diagram illustrating electrode positions related to a tuning fork arm of the angular velocity sensor. FIG. 4 is a block diagram of an example of an electric circuit of the angular velocity sensor.

In FIGS. 1 and 2, reference numerals 20a and 20b depict arms which are vibrating sections, and these are connected by base 20c, a fixed section, to form vibrator 20. Reference numerals 30a and 30b are also arms which are vibrating sections, and these are connected by base 30c, a fixed section, to form vibrator 30. These vibrators 20 and 30 are made of a single crystalline piezoelectric material such as quartz, and are directly bonded for an integral structure to form tuning fork vibrator 10 having one type of the bimorph structure. This tuning fork vibrator 10 has tuning fork arms 10a and 0b and tuning fork base 10c. Direct bonding is performed by first sufficiently smoothening the surface of workpieces and applying it a hydrophilic treatment. Then, after making the workpieces adsorb hydrophilic group, the workpieces are attached. By applying the heat, hydrophilic group and hydrogen separate from the surface and workpieces are bonded to achieve the condition equivalent to the integral structure.

Here, vibrator 20 is bonded in a way that its crystal axis direction is to the left of the paper and vibrator 30 is bonded in a way that its crystal axis direction is to the right of paper, which is an inversed position. More specifically, vibrators 20 and 30 are bonded in a way that their crystal axis directions (x-axis direction) which generate the pieozoelectric phenomenon in their width directions become opposite to each other.

In tuning fork vibrator 10 having this structure, reference numerals 1 to 4 depict first to fourth electrodes which may become a drive electrode, and reference numerals 5 to 8 depict fifth to eighth electrodes which are detection electrodes. These electrodes are disposed over approximately the entire length of tuning fork arms 10a and 10b. These are made by first sputtering or depositing typically Cr on a base material, and then sputtering or depositing Au, Ag, Al, etc. A leader and drawing electrode pad for the drive electrode and detection electrodes are formed on tuning fork base 10c of tuning fork vibrator 10. Here, the leaders of the drive electrode and detection electrode are narrower on base 10c of tuning fork vibrator 10 than the drive electrode and detection electrode formed on tuning fork arms 10a and 10b of tuning fork vibrator 10. This allows to secure a wider distance between the leader of the drive electrode and the leader of the detection electrode, thereby enabling the minimization of the coupled capacity component from the drive electrode to detection electrode.

The first exemplary embodiment describes the case that both first electrode 1 disposed on the surface of tuning fork arm 10a and second electrode 2 disposed on the surface of tuning fork arm 10b act as the drive electrode. Third electrode 3 disposed on the rear face of the tuning fork arm 10a acts as the ground electrode, and fourth electrode 4 disposed on the rear face of tuning fork arm 10b acts as the monitor electrode. Fifth electrode 5 and eighth electrode 8 disposed on the outer side face of tuning fork arms 10a and 10b are commonly connected as the detection electrode, and sixth electrode and seventh electrode 7 disposed on the inner side face of tuning fork arms 10a and 10b are commonly connected as the detection electrode. Drawing electrode pads 15 and 16 for detection electrode and their leaders 15a and 16a are pattern-wired on the surface of tuning fork base 10c. Drawing electrode pads 11 and 12 for drive electrode and their leaders 11a and 12a are also pattern-wired on the surface of tuning fork base 10c. Drawing electrode pad 13 for ground electrode, drawing electrode pad 14 for monitor electrode, and their leaders 13a and 14a are also pattern-wired on the surface of tuning fork base 10c. Leaders 13b and 14b from the ground electrode and monitor electrode to drawing electrode pads 13 and 14 are pattern-wired on the rear face of tuning fork base 10c, and routed to the surface.

In FIG. 3, fifth electrode 5 and eighth electrode 8 disposed on the outer side face of tuning fork arms 10a and 10b are routed to extend to the surface and rear face of tuning fork arms 10a and 10b so that extension electrodes 5a and 8a are disposed in parallel at a predetermined spacing with first electrode 1 and fourth electrode 4. In the same way, extension electrodes 6a and 7a are disposed on the inner face of tuning fork arms 10a and 10b.

Next, the operation of the angular velocity sensor in the first exemplary embodiment is described. AC signal with 180° different phase is supplied from drive power 17 to first electrode 1 and second electrode 2, which are used as the drive electrode, and tuning fork arms 10a and 10b vibrate to the right and left in FIG. 3.

This operation is detailed, taking the case that AC signal is supplied between first electrode 1 and second electrode 2 at one point, and the positive electric field is applied to first electrode 1 and the negative electric field is applied to second electrode 2. As a result, the left half from the center of left tuning fork arm 10a in the width direction stretches because the electric field in the same direction as the electric axis or polarizing direction is applied to the left half from the center of left tuning fork arm 10a in the width direction. On the other hand, the right half from the center of left tuning fork arm 10a in the width direction contracts because the electric field in the reverse direction to the electric axis or polarizing direction is applied to the right half from the center of left tuning fork arm 10a in the width direction. Left tuning fork arm 10a thus bends to the right which is the inside in FIG. 3.

When the signal supplied from drive power 17 inverses at a next point, left tuning fork arm 10a bends this time to the left which is the outside in FIG. 3. The repetition of these operations generate resonant vibration. Here, the left half from the center of right tuning fork arm 10b in the width direction contracts, because the electric field in the reverse direction to the electric axis or polarizing direction is applied to the left half from the center of right tuning fork arm 10b, which is opposite movement from that of left tuning fork arm 10a. On the other hand, the right half from the center of right tuning fork arm 10b in the width direction stretches because the electric field in the same direction as the electric axis -or polarizing direction is applied to the right half from the center of right tuning fork arm 10b in the width direction. Accordingly, right tuning fork arm 10b bends to the left, which is the inside in FIG. 3.

At a next point, however, right tuning fork arm 10b bends to the right this time, which is outside in FIG. 3, when the signal supplied from drive power 17 is inversed. The repetition of these operations generate resonant vibration.

When angular velocity is applied in this resonant vibration state, both tuning fork arms 10a and 10b warp in the thickness direction because the force perpendicular to the vibrating direction is generated based on the Coriolis principle. As a result, electric charge corresponding to a degree of warpage generates as an angular velocity signal in fifth to eighth electrodes 5, 6, 7, and 8, which are the detection electrodes. This electric charge is output through S+ and S− which are commonly connected. Details of this operation is described next. For example, when left tuning fork arm 10a warps upward and right tuning fork arm 10b warps downward in FIG. 3 by Coriolis force when angular velocity is applied, a portion of left tuning fork arm 10a from the center to the bottom in the thickness direction stretches to generate electric charge in the same direction as the electric axis or polarizing direction. Contrary, a portion of left tuning fork arm 10a from the center to the top in the thickness direction contracts to generate the electric charge in the direction opposite to the electric axis or polarizing direction. At the same time, contrary to left tuning fork arm 10a, a portion of right tuning fork arm 10b from the center to the bottom in the thickness direction contracts to generate the electric charge in the direction opposite to the electric axis or polarizing direction, and a portion of right tuning fork arm 10b from the center to the top stretches to generate the electric charge in the same direction as the electric axis or polarizing direction. Accordingly, in this state, the positive charge is generated at S+and negative charge at S− which are commonly connected. By detecting these electric charges, the angular velocity is identifiable. Then, when left tuning fork arm 10a warps downward and right tuning fork arm 10b warps upward in FIG. 3 by Coriolis force, the electric charge opposite to the above description is generated at both tuning form arms 10a and 10b. Accordingly, the negative electric charge is generated at S+ and the positive electric charge at S− which are commonly connected. By detecting these electric charges, the angular velocity is identifiable.

In this resonance state, capacity component is coupled from first electrode 1 and second electrode 2, which are drive power in different polarities, to fifth to eighth electrodes 5, 6, 7, and 8, which are detection electrodes, on each side face. These fifth to eighth electrodes 5, 6, 7, and 8 are detection electrodes in different polarities which have the same surface area and disposed symmetrically to the left and right with a predetermined spacing against first and second electrodes 1 and 2 which act as drive electrodes. In this relation, when capacitive coupling of positive electric charge from first electrode 1, the drive electrode, to fifth and sixth electrodes 5 and 6, the detection electrodes, takes place, capacitive coupling of negative electric charge at the same level takes place from second electrode 2, the drive electrode, to seventh and eighth electrodes 7 and 8, the detection electrodes. These coupled capacity components are thus cancelled in fifth to eighth electrodes 5, 6, 7, and 8 which are detection electrodes.

However, the coupled capacity component to fifth to eighth electrodes 5, 6, 7, and 8, which are detection electrodes, may not be cancelled and output due to a slight deviation in an electrode pattern. In this case, extension electrodes 5a, 6a, 7a, and 8a already provided by extending the electrodes on the side face to the surface cancel the coupled capacity component, even when, for example, the electrode pattern on the surface deviates to the left or right, because the pattern spacing between first electrode 1, which is the drive electrode, and extension electrodes 5a and 6a ; and the spacing between second electrode 2, which is the drive electrode, and extension electrodes 7a and 8a are equivalent.

In other case, an electrode, which is unetched portion caused by a foreign substance between patterns, may remain and generate a coupled capacity component. In this case, the coupled capacity component may be cancelled by finely adjusting the area of extension electrodes 5a, 6a, 7a, and 8a, enabling the detection of angular velocity in high precision.

The same effect is also achievable by finely adjusting first electrode 1 to fourth electrode 4, other than finely adjusting extension electrodes 5a, 6a, 7a, and 8a.

FIG. 4 is a block diagram of an example of an electric circuit of the angular velocity sensor. First, a drive circuit is described. In the drive circuit, a self-excited oscillator includes current amplifying circuit 40, comparison circuit 41, AGC circuit 42, and inverter circuit 43. Here, the electric charge corresponding to the amplitude is generated in monitor electrode 4 of tuning fork vibrator 10. Current amplifying circuit 40 detects this electric charge, and comparison circuit 41 compares this detected electric charge with a predetermined value set for achieving stable amplitude. For example, if a compared value is greater than a predetermined value, AGC circuit 42 applies a sine wave to drive electrode 2 via drive electrode 1 and inverter circuit 43 in order to decrease the amplitude level. On the other hand, if a compared value is smaller than the predetermined value, AGC circuit 42 applies the sine wave to drive electrode 2 via drive electrode 1 and inverter circuit 43 in order to increase the amplitude level. The repetition of these operations enables the control of tuning fork vibrator 10 to vibrate at a constant amplitude.

Next, in the detection circuit, Coriolis force, as aforementioned, occurs by applying the angular velocity, and the electric charge in proportion to the angular velocity in different polarities respectively is generated at detection electrodes 5 and 8, and detection electrodes 6 and 7 of tuning fork vibrator 10. Difference amplifying circuit 44 detects these electric charges, phase shifting circuit 45 advances the phase for 90°, and then synchronous detector 46 executes synchronous detection where a signal passing through current amplifying circuit 40 of the driving circuit is applied, so that only the angular velocity signal is detected. When unwanted signal component generates in each of detection electrodes 5, 6, 7, and 8 in the detection circuit, such unwanted signal component can be cancelled by receiving it at differencial amplifying circuit 44. This detected signal is converted to DC in LPF circuit 47 to output the angular velocity signal as DC component.

Figure 5:
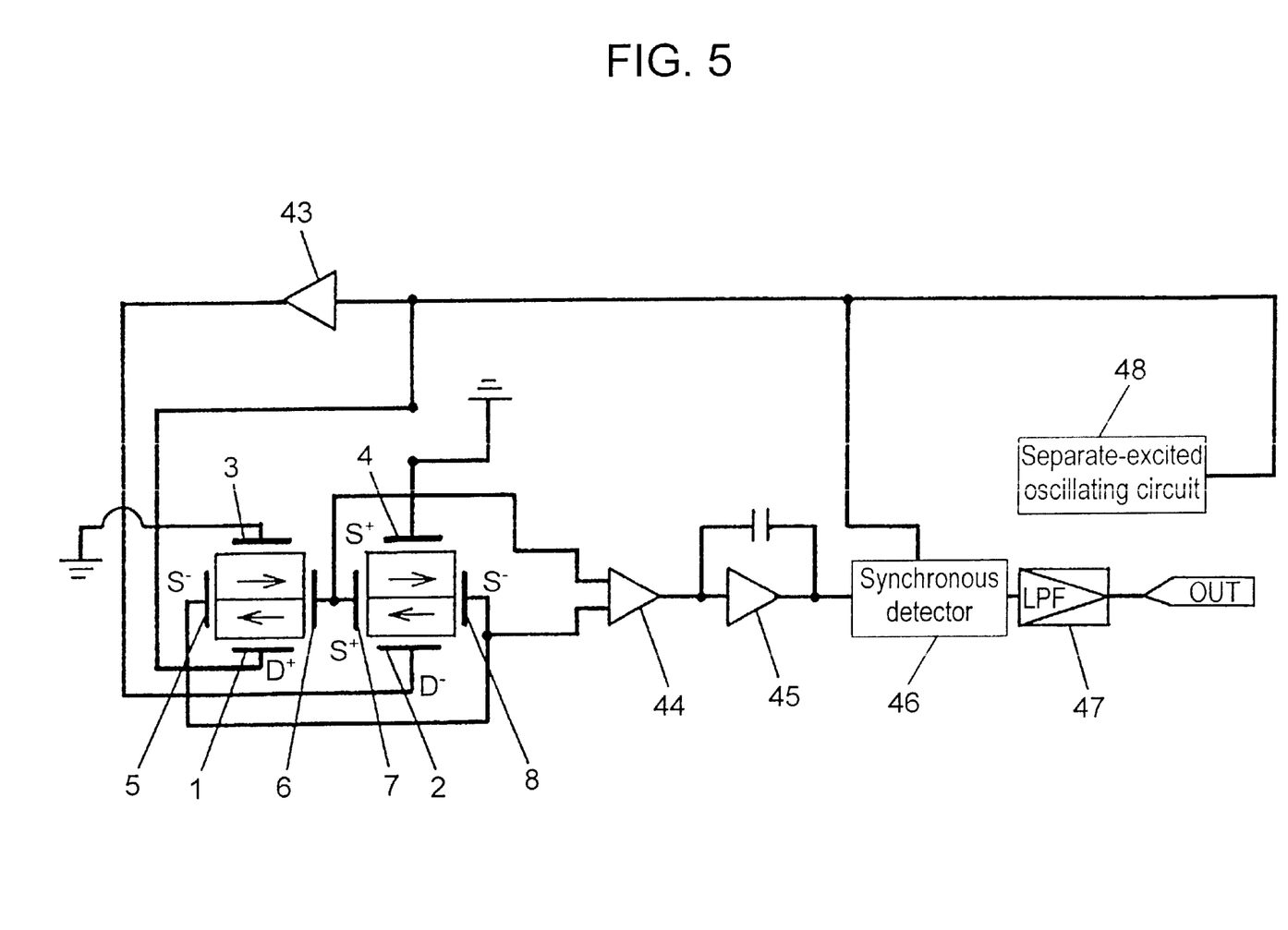
FIG. 5 is a block diagram of another electric circuit of the angular velocity sensor in accordance with the first exemplary embodiment.

As shown in FIG. 5, separate-excited oscillating circuit 48 may be used for the drive circuit. In this case, fourth electrode 4 as the monitor electrode is connected to the ground.

Figure 6:
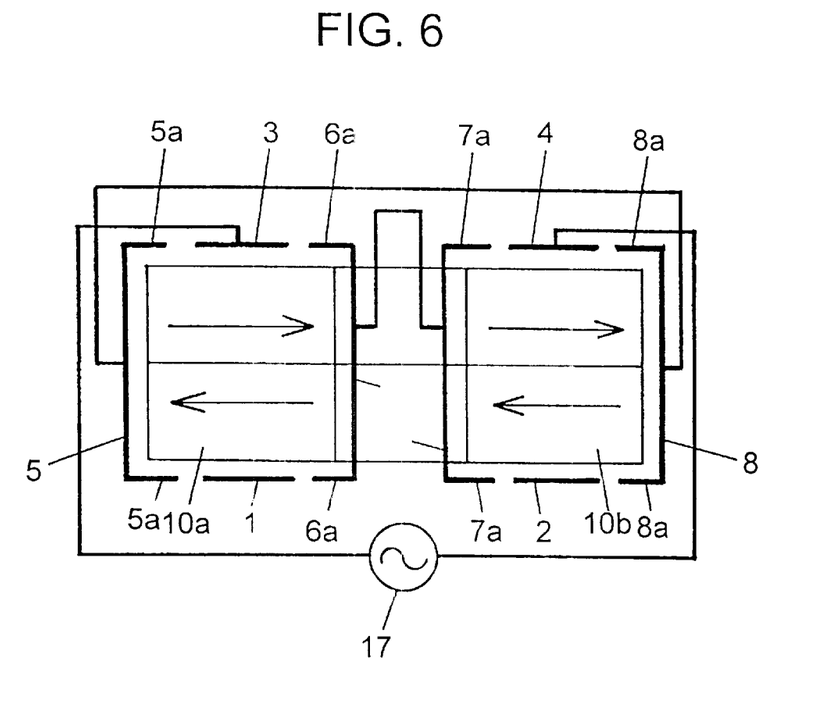
FIG. 6 is a schematic diagram illustrating another electrode positions related to the tuning fork arm in the angular velocity sensor in accordance with the first exemplary embodiment.

The first exemplary embodiment describes the case of providing first electrode 1 and second electrode 2 on the surface of tuning fork arms 10a and 10b as the drive electrode. However, as shown in FIG. 6, third electrode 3 and fourth electrode 4 provided on the rear face of tuning fork arms 10a and 10b may be used as the drive electrode. In this case, drawing electrode pad 13 for ground electrode and drawing electrode pad 14 for monitor electrode shown in FIG. 1 may be used as drawing electrode pads for drive electrode. Accordingly, the pattern wiring of leaders 15a and 16a to leading electrode pads 15 and 16 for detection electrode provided on the surface of tuning fork base 10c of tuning fork vibrator 10 is not disposed in parallel and away from the pattern wiring of leaders 13a and 14a to drawing electrode pads for drive electrode. The coupled capacity component between pattern wirings of these leaders may thus be reduced, offering an advantage to the noise caused by the coupled capacity component.

Figure 7:
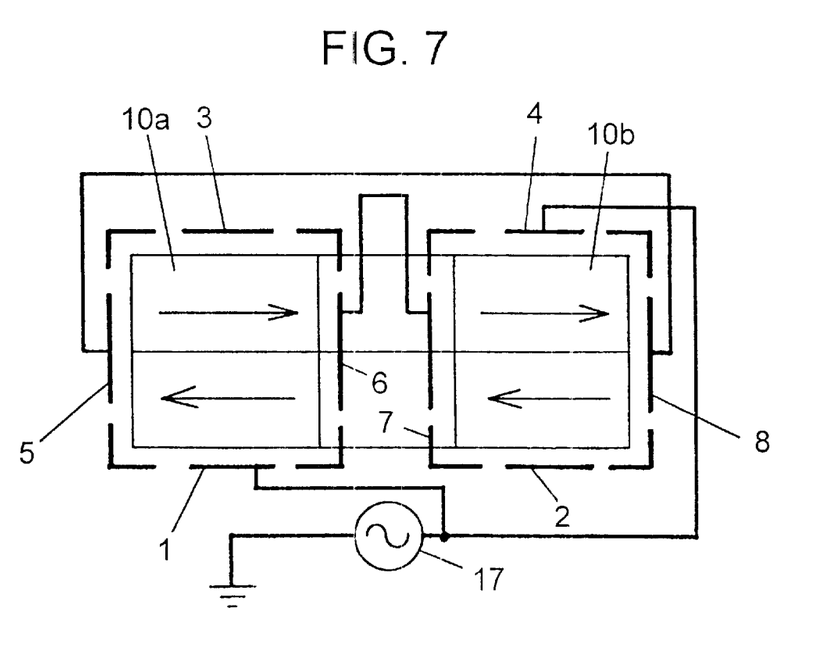
FIG. 7 is a schematic diagram illustrating still another electrode positions related to the tuning fork arm in the angular velocity sensor in accordance with the first exemplary embodiment.
Figure 8:
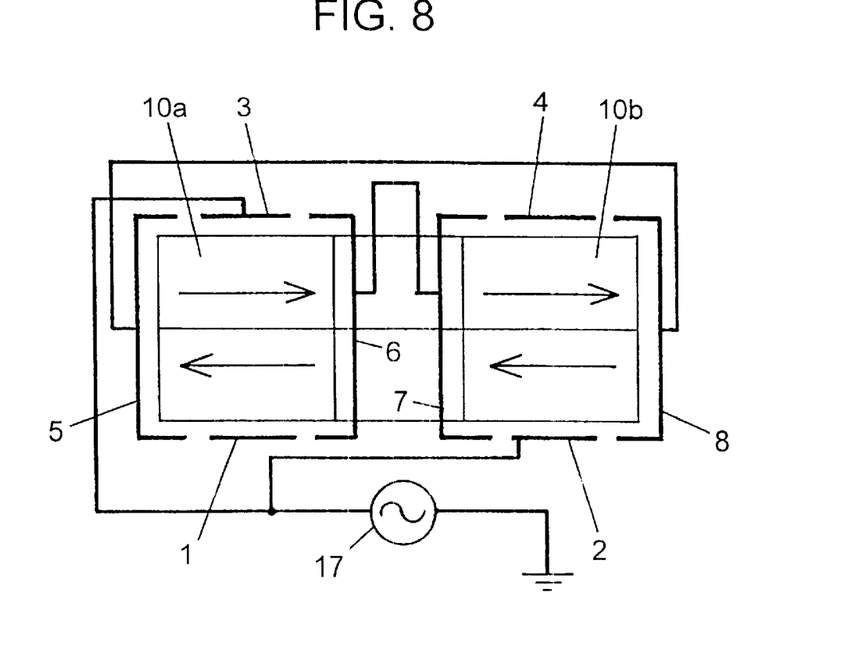
FIG. 8 is a schematic diagram illustrating further another electrode positions related to the tuning fork arm in the angular velocity sensor in accordance with the first exemplary embodiment.

Moreover, as shown in FIG. 7, first electrode 1 and fourth electrode 4 disposed diagonally in both tuning fork arms 10a and 10b may be used as the drive electrode, or, as shown in FIG. 8, second electrode 2 and third electrode 3 may be used as the drive electrode. In these cases, remaining two electrodes are used as the ground electrode and monitor electrode. This case also cancels unwanted coupled capacity component generated by inclined vibration due to processing error in the vibrator, offering an advantage to the noise.

Figure 9:
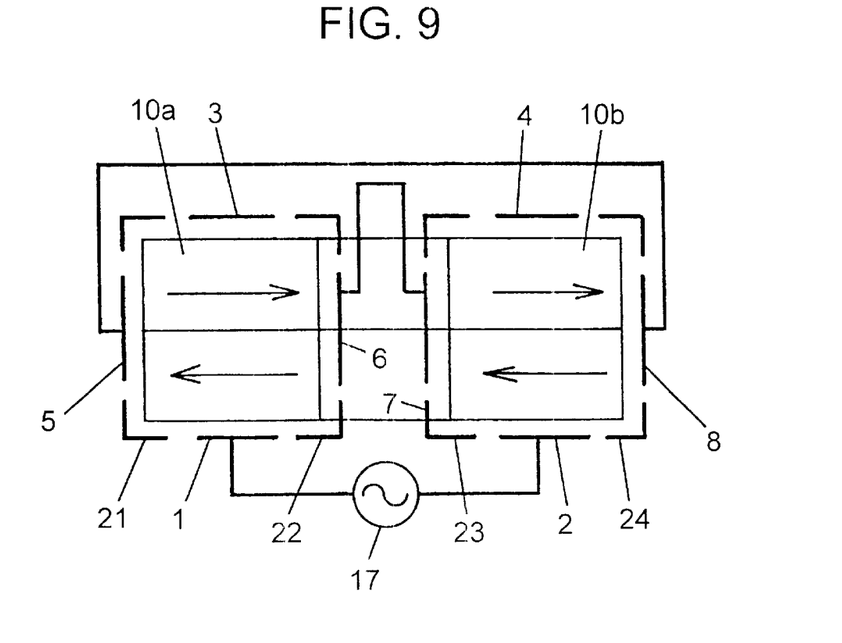
FIG. 9 is a schematic diagram illustrating still further another electrode positions related to the tuning fork arm in the angular velocity sensor in accordance with the first exemplary embodiment.

Furthermore, as shown in FIG. 9, ground electrodes 21, 22, 23, and 24 may be provided between first electrode and second electrode 2, which are the drive electrode, and fifth to eighth electrodes 5, 6, 7, and 8, which are detection electrodes, for filtering out the coupled capacity component from the drive electrode to the detection electrode. In this case, electrodes similar to ground electrodes 21, 22, 23, and 24 may be provided between third electrode 3 and fourth electrode 4, which are not used as the drive electrode, and fifth to eighth electrodes 5, 6, 7, and 8, which are the detection electrodes, for left and right balance of the tuning fork vibrator.

Second Exemplary Embodiment

A second exemplary embodiment of the present invention is described with reference to FIGS. 1, 6, and 10.

Figure 10:
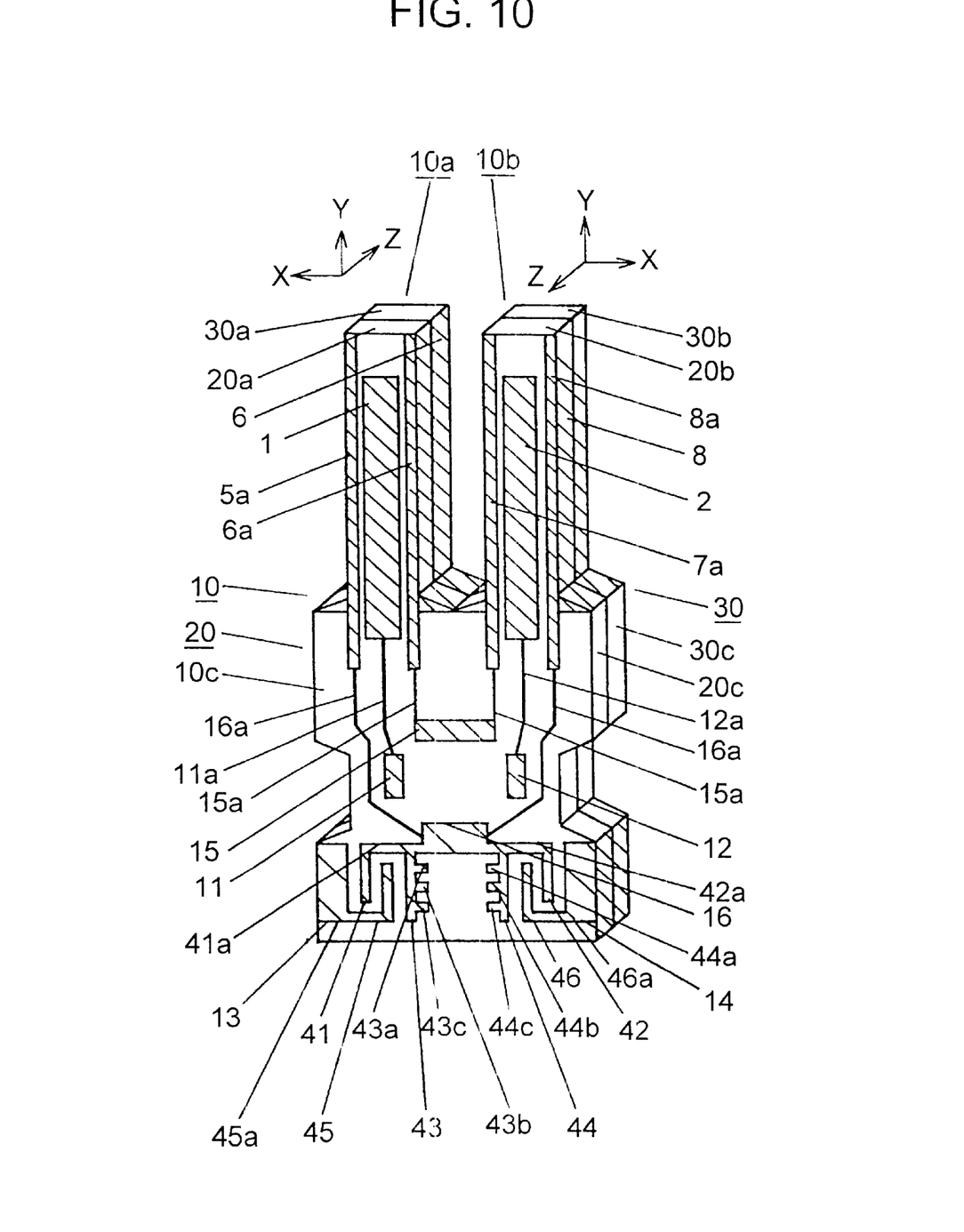
FIG. 10 is a perspective view of a tuning fork vibrator of an angular velocity sensor seen from the surface in accordance with a second exemplary embodiment of the present invention.

FIG. 10 is a perspective view of a tuning fork vibrator of an angular velocity sensor seen from the surface in a second exemplary embodiment of the present invention. In the second exemplary embodiment, first electrode 1 disposed on the surface of tuning fork arm 10a is used as a monitor electrode. Second electrode 2 disposed on the surface of tuning fork arm 10b is used as a ground electrode. Third electrode 3 and fourth electrode 4 disposed on the rear face of tuning fork arms 10a and 10b are used as drive electrodes. Fifth electrode 5 and eighth electrode 8 disposed on an outer face of tuning fork arms 10a and 10b are commonly connected as detection electrodes. Sixth electrode 6 and seventh electrode 7 disposed on an inner face of tuning fork arms 10a and 10b are commonly connected as detection electrodes. Drawing electrode pad 11 for monitor electrode, drawing electrode pad 12 for ground electrode, and their leaders 11a and 12b are pattern-wired. This configuration is the same as that in FIGS. 1 and 6. In FIG. 10, drawing electrode pads 15 and 16 for detection electrode, their leaders 15a and 16a, detection adjustment electrodes 41, 42, 43, and 44; and their connectors 41a and 42a are disposed on the surface of tuning fork base 10c. Scale patterns 43a, 43b, 43c, 44a, 44b, and 44c extending inward and perpendicularly from respective detection adjustment electrodes 43 and 44 are wired onto detection adjustment electrodes 43 and 44. Drawing electrode pads 13 and 14 for drive electrode, drive adjustment electrodes 45 and 46, and their connectors 45a and 46a are pattern-wired. A spacing between detection adjustment electrode 41 and electrode pad 13, and drive adjustment electrode 45; a spacing between detection adjustment electrode 43 and drive adjustment electrode 45; a spacing between detection adjustment electrode 42 and electrode pad 14, and drive adjustment electrode 46; and a spacing between detection adjustment electrode 44 and drive adjustment electrode 46 are equivalent so that the coupled capacity component entering from electrode pad 13 and drive adjustment electrode 45 to detection adjustment electrodes 41 and 43; and the coupled capacity component entering from electrode pad 14 and drive adjustment electrode 46 to detection adjustment electrodes 42 and 44 become equivalent. When the above electrode patterns are ideally manufactured without any defects, the coupled capacity component in the drive electrode and detection electrode become equal design-wise, and thus the coupled capacity component is canceled in the circuit.

However, since it is difficult to manufacture all patterns without any defects, some kind of an imbalance in coupled capacity components occurs. This likely to degrade the sensor output characteristics. Also in this case, unbalanced coupled capacity components are adjustable by trimming all or a part of detection adjustment electrodes 41, 42, 43, and 44. Here, since an electrode provided on tuning fork base 10c is trimmed, there is no effect on drive vibration even when a part of electrodes on tuning fork base 10c is trimmed. In addition, since tuning fork vibrator 10 is generally secured by tuning fork base 10c, electrode provided on tuning fork base 10c may be trimmed using a wide range of physical removing measures. In other words, a physical removing measure for removing not only the electrode but a part of tuning fork base 10c itself may be adopted for trimming the electrode.

In addition, a change in the coupled capacity component against a trimming amount per unit length of detection adjustment electrodes 41 to 44 may be identified in advance so that trimming for adjustment in accordance with an imbalance level of coupled capacity components may be facilitated by utilizing scale patterns 43a, 43b, 43c, 44a, 44b, and 44c provided on detection adjustment electrodes 43 and 44.

Moreover, detection adjustment electrodes 41 to 44 and drive adjustment electrodes 45 and 46 may be disposed in a comb pattern so that an adjustment area of the coupled capacity component can be broadened. For example, the coupled capacity component changes greater by trimming detection adjustment electrode 41 with the same trimming amount when all of detection adjustment electrode 43 is trimmed or all of detection adjustment electrode 41 is trimmed.

The adjustment electrode is not limited to drive adjustment electrodes 45 and 46 and detection adjustment electrodes 41 to 44 in FIG. 10. Diversifying electrode patterns are applicable.

As in this exemplary embodiment, adjustment with higher precision is feasible, compared to adjustment on a circuit, by adjusting an imbalance in coupled capacity components on the tuning fork. In addition, this adjustment method is suitable for temperature characteristics.

Furthermore, a scale pattern may be provided on a part of the drive adjustment electrode or detection adjustment electrode. By identifying a level of change in the coupled capacity component per trimming scale in advance, a trimming amount required in line with the difference in the coupled capacity components between the detection electrode and drive electrode can be easily determined.

Ground electrode 2 may also be used as the drive electrode. This increases the drive efficiency by a factor of 1.5, and also reduces impedance, enabling the suppression of noise.

The second exemplary embodiment describes an example of a structure and method to correct unbalanced coupled capacity components between drive electrodes 3 and 4 and detection electrodes 5 to 8 due to a defect in the electrode pattern on tuning fork vibrator 10 by trimming drive adjustment electrodes 45 and 46 and detection adjustment electrodes 41 to 44 provided on tuning fork base 10c. The same function is also achievable by a structure and method to provide the drive adjustment electrode or detection adjustment electrode on tuning fork arms 10a and 10b and trimming one or both of them.

This exemplary embodiment describes the case of using drive electrodes 3 and 4. However, it is naturally feasible that first electrode 1 used as the monitor electrode may be changed to the drive electrode, and second electrode 2 used as the ground electrode may be used as the monitor electrode. Also in this configuration, the adjustment electrode or detection adjustment electrode is provided on the tuning fork arm or tuning fork base of the tuning fork vibrator so that an imbalance in coupled capacity components between the detection electrode and drive electrode is correctable by trimming one or both of them.

Industrial Applicability

The present invention as described above includes a tuning fork vibrator having a first vibrator and a second vibrator, first electrode and second electrode disposed on the surface of both tuning fork arms of the tuning fork vibrator, third electrode and fourth electrode disposed on the rear face of the tuning fork arm respectively opposing the first and second electrodes, and fifth, sixth, seventh, and eighth electrodes disposed on side faces of both tuning fork arms of the tuning fork vibrator as detection electrodes. The first vibrator includes at least two arms made of a single crystalline piezoelectric material and at least one base for connecting the arms. The second vibrator has approximately the same shape as that of the first vibrator and is made of a single crystalline piezoelectric material. The first vibrator and second vibrator have the crystal axis that generates the piezoelectric phenomenon in inverse polarities to each other in the width direction, and are directly bonded in the thickness direction for an integral structure to form a tuning fork vibrator having at least two tuning fork arms and at least one tuning fork base. When the first electrode disposed on the surface of one of the tuning fork arms of the tuning fork vibrator or the third electrode disposed on the rear face of one of the tuning fork arms is set as the drive electrode, a drive power is connected in a next way. In case the first electrode is used as the drive electrode, the drive signal in a phase different from the first electrode is supplied to the second electrode disposed on the surface of the other tuning fork arm, or the drive signal in the same phase as the first electrode is supplied to the fourth electrode disposed on the rear face of the other tuning fork arm. In case the third electrode is used as the drive electrode, the drive signal in the same phase as the third electrode is supplied to the second electrode disposed on the surface of the other tuning fork arm, or the drive signal in a phase different from the third electrode is supplied to the fourth electrode disposed on the rear face of the other tuning fork arm. The fifth and eighth electrodes provided on the outer face of both tuning fork arms are commonly connected and sixth and seventh electrodes provided on an inner face of both tuning fork arms are commonly connected to take out the detection signal at these commonly connected parts. This allows the elimination of noise caused by unwanted coupled capacity component entering from the drive electrode to detection electrode, thus offering the angular velocity sensor with improved detection characteristics.

What is claimed is:

1. An angular velocity sensor comprising:
    a tuning fork vibrator having:
        a first vibrator including at least two arms formed of a single crystalline piezoelectric material and at least one base for connecting said arms; and
        a second vibrator having an approximate shape to that of said first vibrator and formed of a single crystalline piezoelectric material;
    wherein said first vibrator and said second vibrator are directly bonded in their thickness directions so that their crystal axis directions which generate piezoelectric phenomena have inverse polarities relative to each other in their width directions to form said tuning fork vibrator having at least two tuning fork arms and at least one tuning fork base;
    a first electrode disposed on a surface of one of said two tuning fork arms, and a second electrode disposed on a surface of an other of said two tuning fork arms;
    a third electrode disposed on a rear face of said one of said two tuning fork arms at a position opposing said first electrode, and a fourth electrode disposed on a rear face of said other of said two tuning fork arms at a position opposing said second electrode; and
    fifth, sixth, seventh, and eighth electrodes disposed as detection electrodes on said two tuning fork arms,
    wherein said tuning fork vibrator for connecting a drive power such that:
        when said first electrode acts as a drive electrode,
        a drive signal having a phase different from that of said first electrode is provided to said second electrode; or
        a drive signal having an identical phase with that of said first electrode is provided to said fourth electrode;
        when said third electrode acts as said drive electrode,
        a drive signal having an identical phase with that of said third electrode is provided to said second electrode; or a drive signal having a phase different from that of said third electrode is provided to said fourth electrode, and said fifth electrode and said eighth electrode respectively disposed on an outer side face of said two tuning fork arms and are commonly connected, and said sixth electrode and said seventh electrode respectively disposed on an inner side face of said two tuning fork arms and are commonly connected, so that a detection signal is output at the commonly connected parts.

2. The angular velocity sensor as defined in claim 1, wherein one of remaining two electrodes disposed on the both tuning fork arms of said tuning fork vibrator is used as a ground electrode and the other as a monitor electrode, and a self-excited oscillator is used for the drive power.

3. The angular velocity sensor as defined in claim 1, wherein remaining two electrodes disposed on the both tuning fork arms of said tuning fork vibrator are used as ground electrodes, and a separate-excited oscillator is used for the drive power.

4. The angular velocity sensor as defined in claim 1, wherein a ground electrode is disposed between the drive electrode and the detection electrodes.

5. The angular velocity sensor as defined in claim 1, wherein the detection electrodes are extended to a part of a surface of one of the two tuning fork arms where the drive electrode is disposed.

6. The angular velocity sensor as defined in claim 5, wherein the detection electrodes disposed extending to the part of the surface of said one of the two tuning fork arms are removed in a way to achieve equivalent coupled capacities thereof with said drive electrode.

7. The angular velocity sensor as defined in claim 1, wherein the drive electrodes disposed on surfaces of the two tuning fork arms are removed in a way to achieve equivalent coupled capacities thereof with the detection electrodes.

8. The angular velocity sensor as defined in claim 1, wherein the detection electrodes in different polarities are disposed symmetrically to the right and left against said drive electrode for canceling a difference in a potential trend of coupled capacities between the detection electrodes and the drive electrode.

9. The angular velocity sensor as defined in claim 1, wherein the detection electrodes are disposed symmetrically to the right and left at a predetermined spacing against said drive electrode for canceling a difference in potential trends of coupled capacities between the detection electrodes and the drive electrode.

10. The angular velocity sensor as defined claim 1, wherein a leader is made narrower on the tuning fork base for reducing a coupled capacity between leaders to a respective drawing electrode pad for the drive electrode and one of the detection electrodes.

11. The angular velocity sensor as defined in claim 1, wherein said first electrode and said second electrode disposed on the surface of the both tuning fork arms of said tuning fork vibrator are respectively used as a monitor electrode and a ground electrode; and said third electrode and said fourth electrode disposed on the rear face of said both tuning fork arms are respectively used as a drive electrode; and a leader on the surface of the tuning fork base of said tuning fork vibrator to a drawing electrode pad for one of the detection electrodes is formed in a way not to be disposed in parallel to a leader on the surface of said tuning fork base to a drawing electrode pad for said drive electrode.

12. The angular velocity sensor as defined in claim 1, wherein a difference of coupled capacities components in the same phase contained in a detection signal from the detection electrodes commonly connected is detected for canceling a difference in potential trends of coupled capacities between the detection electrodes and the drive electrode.

13. The angular velocity sensor as defined in claim 1, wherein said detection electrodes have equivalent areas on a side face of the both tuning fork arms.

14. The angular velocity sensor as defined in claim 1, wherein at least one of a drive adjustment electrode and a detection adjustment electrode is provided on said tuning fork vibrator for correcting an imbalance in coupled capacity components between the detection electrodes and the drive electrode.

15. The angular velocity sensor as defined in claim 14, wherein said drive adjustment electrode and said detection adjustment electrode are disposed on the base of said tuning fork vibrator.

16. The angular velocity sensor as defined in claim 11, wherein at least one of a drive adjustment electrode and a detection adjustment electrode is provided on said tuning fork vibrator for correcting an imbalance in coupled capacity components between the detection electrodes and the drive electrode.

17. The angular velocity sensor as defined in claim 16, wherein said drive adjustment electrode and said detection adjustment electrode are provided on the base of said tuning fork vibrator.

18. An angular velocity sensor comprising:
a tuning fork vibrator having:
a first vibrator including at least two arms formed of a single crystalline piezoelectric material and at least one base for connecting said arms; and
a second vibrator having an approximate shape to that of said first vibrator and formed of a single crystalline piezoelectric material;
wherein said first vibrator and said second vibrator are directly bonded in their thickness directions so that their crystal axis directions which generate piezoelectric phenomena have inverse polarities relative to each other in their width directions to form said tuning fork vibrator having at least two tuning fork arms and at least one tuning fork base;
a first electrode disposed on a surface of one of said two tuning fork arms, and a second electrode disposed on a surface of an other of said two tuning fork arms;
a third electrode disposed on a rear face of said one of said two tuning fork arms at a position opposing said first electrode, and a fourth electrode disposed on a rear face of said other of said two tuning fork arms at a position opposing said second electrode; and
fifth, sixth, seventh, and eighth electrodes disposed on said two tuning fork arms as detection electrodes,
wherein said tuning fork vibrator is for connecting a drive power such that:
three of said first, second, third, and fourth electrodes are used as drive electrodes and a remaining electrode is used as a monitor electrode;
a drive signal in different phases to each other is supplied to said first electrode and said third electrode; and
when said second electrode is used as one of the drive electrodes, a drive signal is supplied in a way that said second and first electrodes have different phases; and
when said fourth electrode is used as one of the drive electrodes, the drive signal is supplied in a way that said fourth electrode and said first electrode have the same phase, and said fifth electrode and eighth electrode respectively dispose on an outer side face of said two tuning fork arms are commonly connected, and said sixth electrode and seventh electrode disposed on an inner side face of said two tuning fork arms are commonly connected so that a detection signal is output at the commonly connected sections in said tuning fork vibrator, and said tuning fork vibrator is provided with at least one of a drive adjustment electrode and a detection adjustment electrode for correcting an imbalance in coupled capacity components between said detection electrodes and one of said drive electrodes.

19. The angular velocity sensor as defined in claim 18, wherein said drive adjustment electrode and said detection adjustment electrode are disposed on the base of said tuning fork vibrator.

* * * * *